(12) United States Patent
Nakamura et al.

(10) Patent No.: US 11,022,624 B2
(45) Date of Patent: Jun. 1, 2021

(54) ENVIRONMENTAL SENSOR

(71) Applicant: OMRON Corporation, Kyoto (JP)

(72) Inventors: Kayo Nakamura, Kusatsu (JP);
Naotsugu Ueda, Kusatsu (JP); Ryusuke Sakai, Kyoto (JP); Takanobu Yamauchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 176 days.

(21) Appl. No.: 15/868,408

(22) Filed: Jan. 11, 2018

(65) Prior Publication Data

US 2018/0259550 A1    Sep. 13, 2018

(30) Foreign Application Priority Data

Mar. 13, 2017    (JP) .............. JP2017-047877

(51) Int. Cl.
*G01D 21/02*    (2006.01)
*G01P 13/00*    (2006.01)
*G01J 1/42*    (2006.01)
*G01P 15/08*    (2006.01)

(52) U.S. Cl.
CPC .............. *G01P 13/00* (2013.01); *G01D 21/02* (2013.01); *G01J 1/4204* (2013.01); *G01P 15/0802* (2013.01)

(58) Field of Classification Search
CPC .... G01P 13/00; G01P 15/0802; G01J 1/4204; G01C 5/005; G01C 5/06; G01C 5/00; G01D 21/02
USPC ... 73/493, 170.05–170.15, 170.34, 384–387, 73/700–755, 865.2; 340/970, 977, 601, 340/602; 356/614–624, 399, 400
See application file for complete search history.

(56) References Cited

U.S. PATENT DOCUMENTS

| 5,055,671 A * | 10/1991 | Jones ................. A61B 5/02416 250/227.21 |
| 6,604,427 B1 * | 8/2003 | Coleman ............... G01L 9/0039 73/705 |
| 2007/0218823 A1 * | 9/2007 | Wolf ........................ G01C 5/06 454/72 |
| 2008/0234935 A1 | 9/2008 | Wolf et al. |
| 2010/0064785 A1 * | 3/2010 | Kummer ............... G01L 9/0077 73/114.19 |
| 2011/0224925 A1 * | 9/2011 | Tsubata ..................... G01C 5/06 702/60 |
| 2012/0176236 A1 | 7/2012 | Kao et al. |

(Continued)

FOREIGN PATENT DOCUMENTS

| CN | 102401671 A | 4/2012 |
| CN | 104848899 A | 8/2015 |

(Continued)

OTHER PUBLICATIONS

The extended European search report (EESR) dated Apr. 16, 2018 in a counterpart European Patent application.

(Continued)

*Primary Examiner* — Robert R Raevis
(74) *Attorney, Agent, or Firm* — Metrolex IP Law Group, PLLC

(57) ABSTRACT

An environmental sensor including a plurality of sensor elements that measure a plurality of physical quantities associated with a surrounding environment detects moving of an environmental sensor based on an illuminance and a change in the illuminance among the plurality of physical quantities, and transmits an alert signal to a user when the moving of the environmental sensor is detected.

9 Claims, 9 Drawing Sheets

(56) References Cited

U.S. PATENT DOCUMENTS

| | | |
|---|---|---|
| 2012/0210797 A1* | 8/2012 | Yu .................. G01L 9/0079 |
| | | 73/705 |
| 2015/0185806 A1 | 7/2015 | S et al. |
| 2016/0003698 A1* | 1/2016 | Wiesbauer ........ G01L 13/025 |
| | | 381/174 |
| 2016/0187196 A1* | 6/2016 | Kim .................... G01J 1/44 |
| | | 250/206.1 |
| 2017/0284840 A1 | 10/2017 | Mino et al. |
| 2018/0067546 A1 | 3/2018 | Yoshikawa et al. |
| 2018/0174420 A1* | 6/2018 | Clark .............. G08B 21/0446 |
| 2018/0203458 A1 | 7/2018 | Zhang et al. |
| 2019/0265782 A1 | 8/2019 | Yoshikawa et al. |

FOREIGN PATENT DOCUMENTS

| | | | |
|---|---|---|---|
| CN | 105021225 A | | 11/2015 |
| EP | 2490101 A1 | | 8/2012 |
| JP | 2006-300734 A | | 11/2006 |
| JP | 2008-64616 A | | 3/2008 |
| JP | 2011-145804 A | | 7/2011 |
| JP | 2012-65107 A | | 3/2012 |
| JP | 2016-170541 A | | 9/2016 |
| JP | 2016-194798 A | | 11/2016 |
| KR | 100706370 | * | 4/2007 |

OTHER PUBLICATIONS

The Office Action dated Jan. 8, 2020 in a related Chinese patent application.
The Office Action dated Mar. 17, 2020 in a counterpart Japanese patent application.

* cited by examiner

ENVIRONMENTAL SENSOR

CROSS REFERENCE TO RELATED APPLICATIONS

This application claims priority from prior Japanese Patent Application No. 2017-047877 filed with the Japan Patent Office on Mar. 13, 2017, the entire contents of which are incorporated herein by reference.

FIELD

The disclosure relates to an environmental sensor that measures a plurality of physical quantities associated with a surrounding environment.

BACKGROUND

Devices including various measurement units for obtaining biometric information about a user or environmental information about a surrounding environment have been developed (e.g., Patent Literature 1). A device described in Patent Literature 1 includes a plurality of measurement units and a notification unit. Also, various sensor elements have been developed to detect physical quantities including temperature, humidity, atmospheric pressure, and a light level. Micro electro mechanical systems (MEMS) sensor elements (hereafter also referred to as MEMS sensors) using MEMS technology, which are compact and consume low power, now receive attention. Such compact and low power MEMS sensor elements may be incorporated in a single device, enabling the design of an environmental sensor including multiple different sensor elements.

An environmental sensor with this structure can detect multiple physical quantities associated with, for example, an office environment or a living space, and can obtain, for example, various items of information such as biometric information and environmental information, in addition to energy-related information such as electric power. Such information can then be used to support multidirectional analysis and use of information.

An environmental sensor including multiple sensor elements is typically installed at a fixed location for continuously measuring the environment for a fixed duration. However, the environmental sensor may be unintentionally moved to a different location. For example, a plug-in environmental sensor may be moved together with its power strip, or an environmental sensor installed on a piece of furniture indoors may be moved together with the furniture.

In this case, data obtained after the environmental sensor is moved (its location is changed) can differ from data intended initially. If the measurement is continued using the environmental sensor without its moving being detected, the resultant data can either be useless or be used to produce wrong conclusions.

CITATION LIST

Patent Literature

Patent Literature 1: Japanese Unexamined Patent Application Publication No. 2006-300734
Patent Literature 2: Japanese Unexamined Patent Application Publication No. 2008-64616

SUMMARY

Technical Problem

In response to the above known technique, one or more aspects are directed to a technique for detecting unintended moving of an environmental sensor to reduce wasted time and energy caused by the environmental sensor obtaining useless data or to reduce undesirable erroneous data accumulation, and for improving the efficiency or the quality of environmental measurements.

Solution to Problem

In response to the above issue, one aspect provides an environmental sensor that detects moving of the environmental sensor based on at least one of a plurality of physical quantities measurable by the environmental sensor or a change in the at least one physical quantity, and performs a predetermined moving response process when the moving of the environmental sensor is detected.

More specifically, the environmental sensor for measuring a plurality of physical quantities associated with a surrounding environment includes a plurality of sensor elements, a moving detection unit that detects moving of the environmental sensor based on at least one of the physical quantities or a change in the at least one physical quantity, and a moving response unit that performs a predetermined moving response process when the moving detection unit detects the moving of the environmental sensor.

This structure can readily detect moving of the environmental sensor based on the physical quantities or their change values measured by the sensor elements inherent to the environmental sensor without adding special components.

In the above aspect, the sensor elements may include an illuminance sensor, and the moving detection unit may detect the moving based on a decrease in an illuminance detected by the illuminance sensor. This structure can detect moving of the environmental sensor by a third party based on the pattern of a decrease in an illuminance when the third party grips and moves the environmental sensor.

In the above aspect, the sensor elements may include an illuminance sensor and an acceleration sensor, and the moving detection unit may detect the moving of the environmental sensor when a change in an illuminance detected by the illuminance sensor is greater than or equal to a predetermined value before and after the acceleration sensor detects an acceleration greater than or equal to a predetermined value and/or a change in an acceleration within a predetermined range. This structure can detect moving of the environmental sensor in a more reliable manner when the environmental sensor is moved by a third party to a surrounding environment with a different illuminance.

In the above aspect, the sensor elements may include a temperature sensor and an acceleration sensor, and the moving detection unit may detect the moving of the environmental sensor when a change in a temperature detected by the temperature sensor is greater than or equal to a predetermined value before and after the acceleration sensor detects an acceleration greater than or equal to a predetermined value and/or a change in an acceleration within a predetermined range. This structure can detect moving of the environmental sensor in a more reliable manner when the environmental sensor is moved by a third party to a surrounding environment with a different temperature.

In the above aspect, the moving response process may include transmitting an alert signal to a user. This structure can notify a user of at least moving of the environmental sensor and can prevent the user from determining erroneous data as correct data.

In the above aspect, the moving response process may include stopping measuring at least one of the physical quantities. This structure can reduce wasted time and energy resulting from the environmental sensor continuously obtaining useless data after the environmental sensor is moved in a more reliable manner and prevent wrong conclusions based on erroneous measurement results in a more reliable manner.

The above aspects for solving the issues may be used in combination.

Advantageous Effects

The environmental sensor according to one or more aspects may reduce wasted time and energy caused by the environmental sensor obtaining useless data or reduces undesirable erroneous data accumulation, by detecting unintended moving of the environmental sensor, and thus improves the efficiency or the quality of environmental measurements.

DETAILED DESCRIPTION

Embodiments will now be described in detail by way of example with reference to the drawings.

First Embodiment

Figure 1:
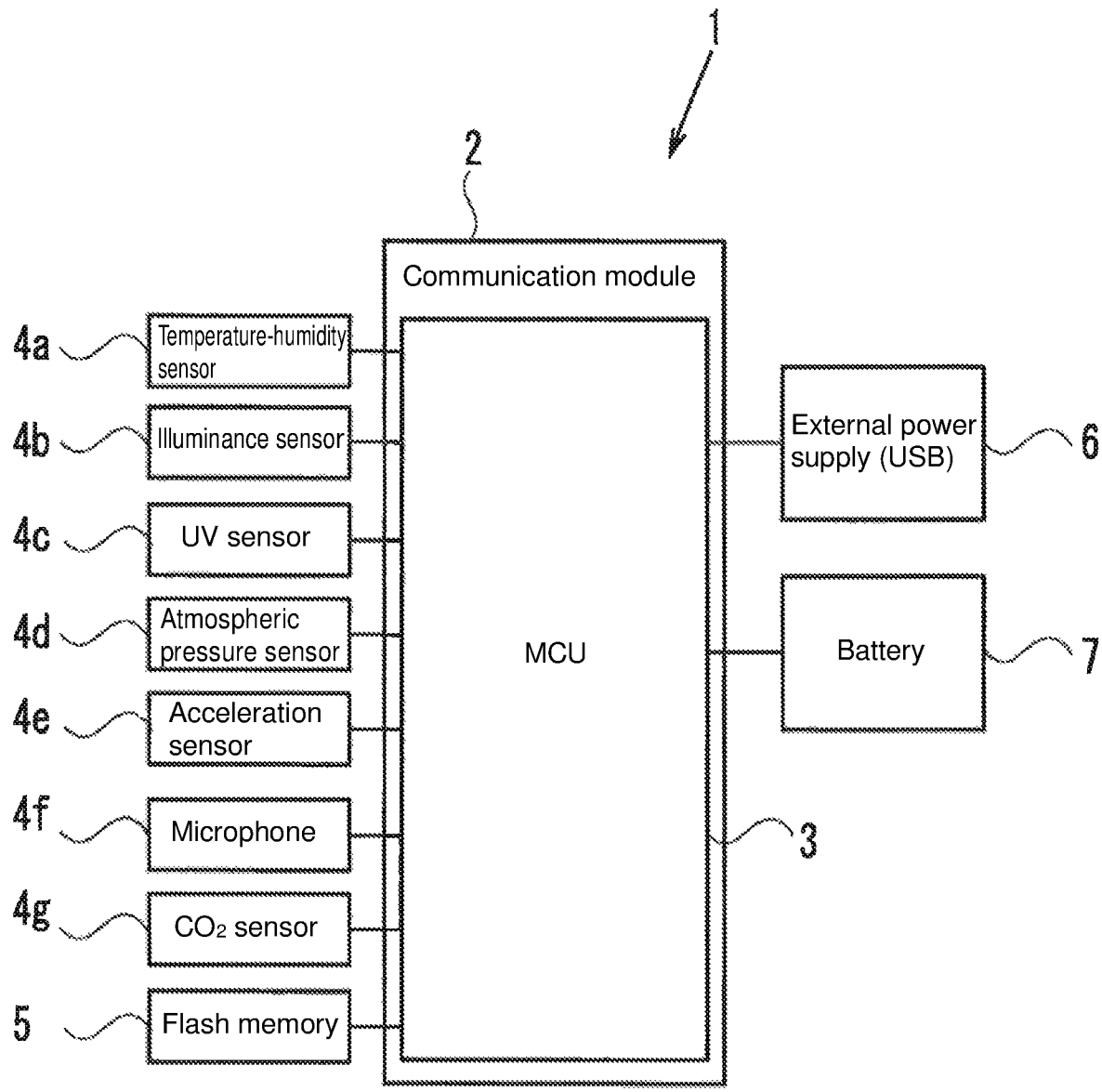
FIG. 1 is a block diagram illustrating an environmental sensor unit according to an embodiment.

FIG. 1 is a block diagram of an environmental sensor unit 1, which is an environmental sensor according to the present embodiment. The environmental sensor unit 1 includes a plurality of sensors 4a to 4g as sensor elements, a flash memory 5, which temporarily stores measured results, a communication module 2, which allows communication with an external device, and a micro controller unit (MCU) 3, which is a processing unit. More specifically, the sensors 4a to 4g include a temperature-humidity sensor 4a, an illuminance sensor 4b, an ultraviolet (UV) sensor 4c, an atmospheric pressure (absolute pressure) sensor 4d, an acceleration sensor 4e, a microphone (acoustic sensor) 4f, and a $CO_2$ sensor 4g. These sensors can continuously obtain environmental data about the environment surrounding the environmental sensor unit 1. The communication module 2 communicates with a remote controller (not shown), such as a smartphone, to transmit environmental data detected by the sensors 4a to 4g to the remote controller and to receive control signals for controlling the environmental sensor unit 1 from the remote controller.

The flash memory 5 can temporarily store data measured by the sensors 4a to 4g to prevent loss of various items of environmental data when the communication with the communication module 2 is disabled. The MCU 3 controls the sensors 4a to 4g, the flash memory 5, and the communication module 2. The environmental sensor unit 1 includes a connecting terminal for connection to an external power supply 6, and a housing for a battery 7. The environmental sensor unit 1 can thus be driven both by the external power supply 6 through, for example, a universal serial bus (USB), and by the battery 7.

Figure 2:
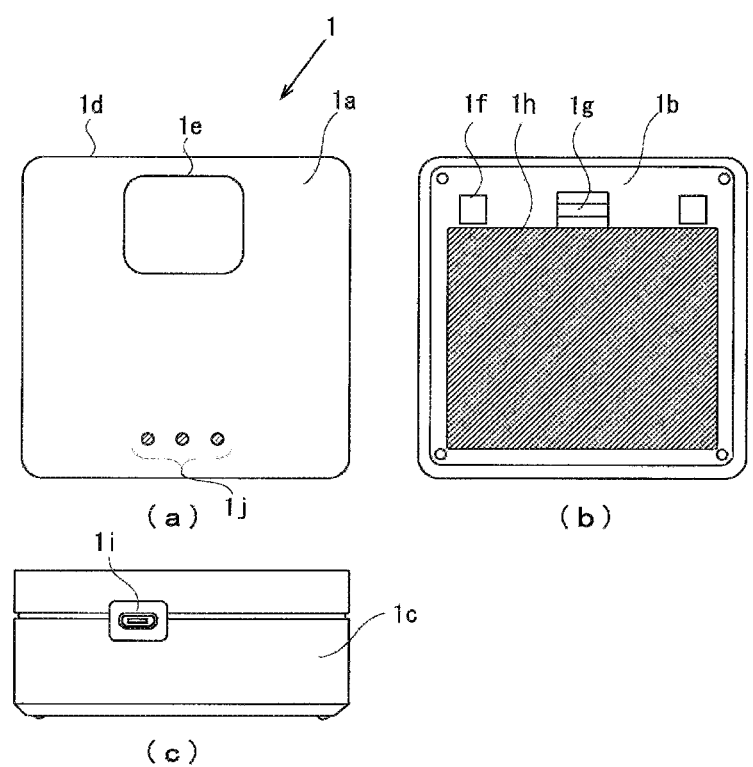
FIGS. 2A to 2C are external three views illustrating an environmental sensor unit according to a first embodiment.

FIGS. 2A to 2C are external views of the environmental sensor unit 1 according to the present embodiment. FIG. 2A is a front view of the environmental sensor unit 1 viewed from its front surface 1a, FIG. 2B is a back view of the environmental sensor unit 1 viewed from its back surface 1b, and FIG. 2C is a side view of the environmental sensor unit 1 viewed from its one side surface 1c. The environmental sensor unit 1 according to the present embodiment includes a rectangular parallelepiped casing 1d, which is substantially square when viewed from the front surface 1a, and is substantially rectangular when viewed from the side surface 1c. The components shown in FIG. 1 (excluding the external power supply 6) are contained in the casing 1d.

The environmental sensor unit 1 is placed on the floor with its back surface 1b on the floor surface, or is hung on the wall with its back surface 1b facing the wall surface to have its front surface 1a exposed to the outside environment. The front surface 1a has a lighting window 1e for collecting visible light and UV light. The lighting window 1e is formed from a material that transmits visible light and UV light. The intensity of the visible light passing through the lighting window 1e is detected by the illuminance sensor 4b, and the intensity of the UV light passing through the lighting window 1e is detected by the UV sensor 4c. This enables measurement of the illuminance and the UV light. The front surface 1a further has vents 1j, which allow the outside air to flow into the environmental sensor unit 1. The target physical quantities are measured by the temperature-humidity sensor 4a, the atmospheric pressure sensor 4d, the microphone 4f, and the $CO_2$ sensor 4g using the outside air around the environmental sensor unit 1 flowing through the vents 1j into the environmental sensor unit 1.

The environmental sensor unit 1 has, on its back surface 1b, a lock tab 1g for opening and closing a back lid on the back surface 1b, recesses 1f that are to be engaged with wall hooks (not shown) to allow mounting on the wall, and a magnet 1h that allows installation on a piece of furniture formed from a ferromagnetic material. The back lid (not shown) is arranged below the magnet 1h, and can internally receive a battery mountable for a battery-powered operation. Also, the side surface 1c has a connector 1i for connection to the external power supply 6. The environmental sensor unit 1 installed at a location where environmental information is to be obtained enables continuous measurement of information including temperature and humidity, illuminance, UV light intensity, atmospheric pressure (absolute pressure), acceleration under vibrations or other factors, noise, and $CO_2$.

As described above, this type of environmental sensor unit 1 is designed to be installed at a location exposed to the environment in which environmental information is continuously obtained. However, the environmental sensor unit 1 may be moved by, for example, a malicious or careless third party as unintended by the user. More specifically, the environmental sensor unit 1 may be moved to a different location by a deceptive third party, or the environmental sensor unit 1 fixed to a piece of furniture or a power strip may be moved together with the furniture or the power strip by a careless third party.

In that case, environmental data obtained during or after such moving can be the data unintended by the user, which can cause wasted time and energy. Further, the user using such environmental data without noticing the wrong data may obtain erroneous measurement results. In the present embodiment, the environmental sensor unit 1 determines that the environmental sensor unit 1 has been moved using initially obtainable information, and performs processing as appropriate.

Figure 3:
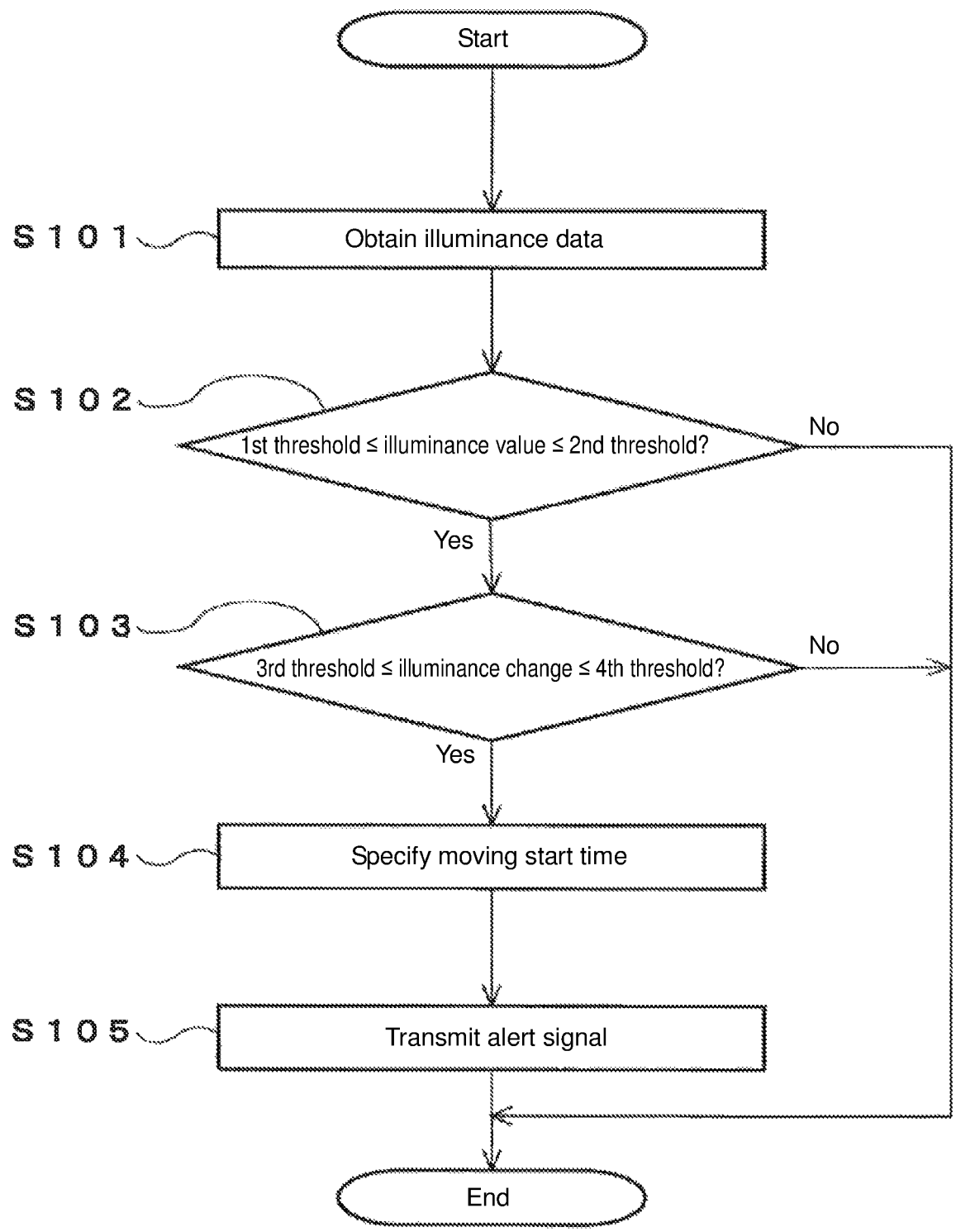
FIG. 3 is a flowchart illustrating a control procedure for a moving detection routine according to a first embodiment.

FIG. 3 is a flowchart showing a moving detection routine 1 according to the present embodiment. This routine is a program stored in a memory (not shown; the same applies hereafter) of the MCU 3, and is executed repeatedly by a processor (not shown; the same applies hereafter) included in the MCU 3 at predetermined intervals.

When this routine is started, illuminance data is first obtained by the illuminance sensor 4b in S101. After the processing in step S101 is complete, the processing advances to S102. In S102, the processor determines whether the obtained illuminance value is greater than or equal to a predetermined first threshold and is less than or equal to a predetermined second threshold. This processing is to detect a decrease in the illuminance measured by the illuminance sensor 4b when a third party grips the environmental sensor unit 1 and covers the lighting window 1e with his or her hand. When a third party is around the installation location of the environmental sensor unit 1, the light at the location (in a room for example) is likely to be on. The first and second thresholds may thus be set to the lower and upper limit illuminance that is experimentally determined by measuring the illuminance values with a hand being placed over the environmental sensor unit 1 while the room illumination is on.

When the obtained illuminance value is greater than or equal to the predetermined first threshold and is less than or equal to the predetermined second threshold in S102, the processing advances to S103. When the obtained illuminance value is less than the first threshold or is greater than the second threshold, the processor determines that this is not the situation in which a third party has placed his or her hand over the environmental sensor unit 1 while the illumination is on, and the routine ends.

In S103, the processor determines whether the change in the obtained illuminance value is greater than or equal to a predetermined third threshold and is less than or equal to a predetermined fourth threshold. This processing is also to detect a decrease by a predetermined change in the measured illuminance when a third party grips the environmental sensor unit 1 and covers the lighting window 1e with his or her hand. The third and fourth thresholds may be set to the lower and upper limit of illuminance change values that are experimentally determined by measuring the illuminance change values in a normal operation in which a third party places his or her hand over the environmental sensor unit 1, which differs from the situation in which the room light is turned off at the installation location of the environmental sensor unit 1.

When the change in the obtained illuminance value is greater than or equal to the third threshold and is less than or equal to the fourth threshold in S103, the processing advances to S104. When the change in the obtained illuminance value is less than the third threshold or is greater than the fourth threshold, the processor determines that this is not the situation in which a third party has placed his or her hand over the environmental sensor unit 1 while the room light is on (the situation in which the room light is turned off), and the routine ends.

In S104, the processor specifies the time at which the environmental sensor unit 1 has started moving after the time at which the illuminance value changed, which is detected in S102 and S103. After the processing in step S104 is complete, the processing advances to S105.

In S105, an alert signal indicating that the environmental sensor unit 1 has been moved is transmitted from the communication module 2 to a remote controller (not shown), such as a smartphone, at the moving start time specified in S104. After the processing in step S105 is complete, the routine ends.

As described above, moving of the environmental sensor unit 1 is detected using the illuminance value and the illuminance change value measured by the illuminance sensor 4b in the environmental sensor unit 1 in the present embodiment. In this case, an alert signal is transmitted to the user. This reduces wasted time and energy resulting from the environmental sensor unit 1 continuously obtaining data unintended by the user and thus reduces any wrong conclusions based on erroneous measurement results. The MCU 3 performing the processing in S101 to S103 in the present embodiment functions as a moving detection unit of one or more embodiments. The process for transmitting the alert signal in S105 corresponds to a moving response process of one or more embodiments. The MCU 3 performing the processing in S105 functions as a moving response unit of one or more embodiments.

Second Embodiment

A second embodiment will now be described. In the example described in the present embodiment, the moving of an environmental sensor unit is detected based on acceleration data and illuminance data measured by the environmental sensor unit.

Figure 4:
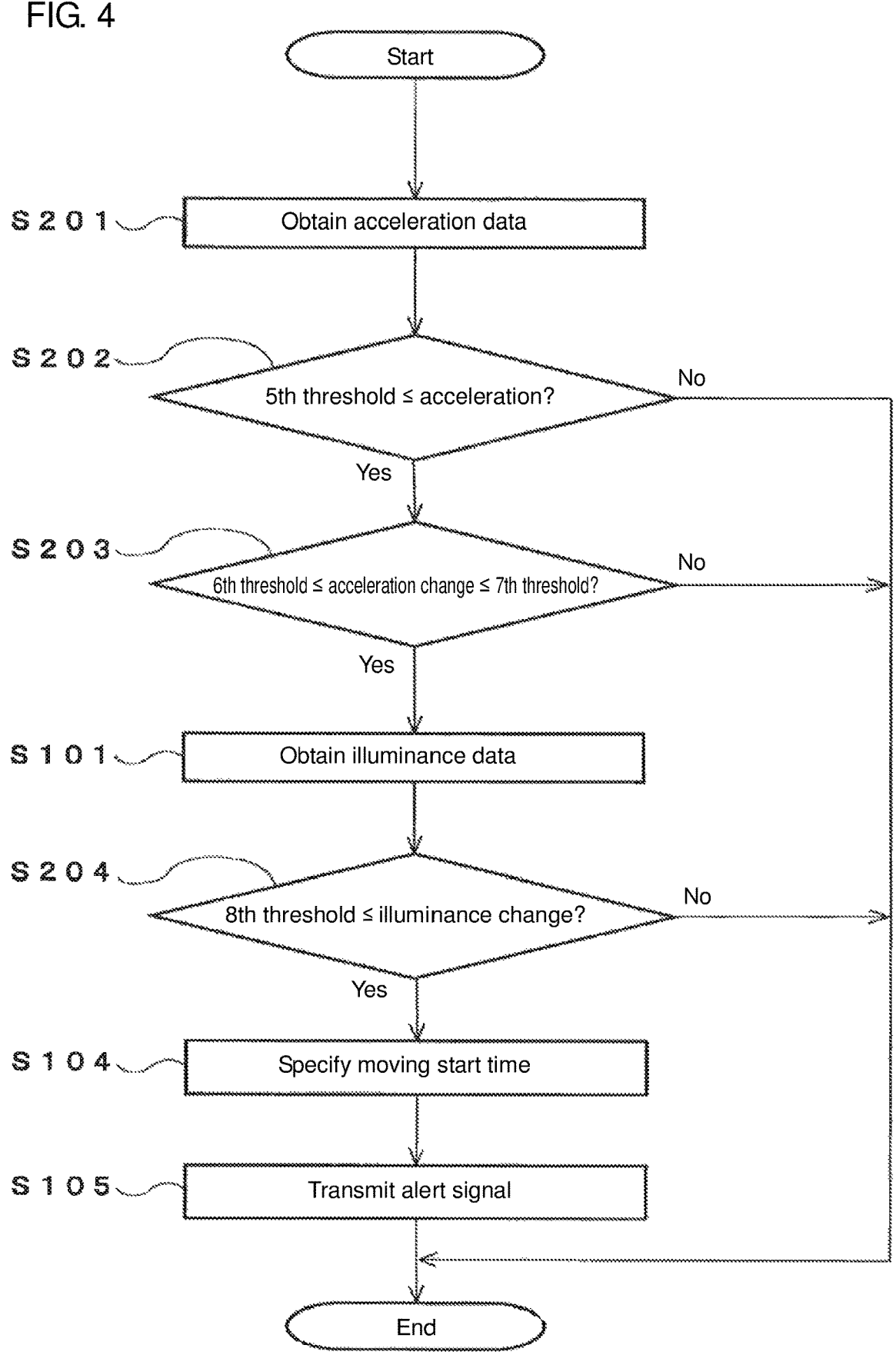
FIG. 4 is a flowchart illustrating a control procedure for a moving detection routine 2 according to a second embodiment.

FIG. 4 is a flowchart showing a moving detection routine 2 according to the present embodiment. This routine is a program stored in the memory included in the MCU 3, and is executed repeatedly by the processor included in the MCU 3 at predetermined intervals.

When this routine is started, acceleration data is first obtained by the acceleration sensor 4e in S201. After the processing in step S201 is complete, the processing advances to S202. In S202, the processor determines whether the obtained acceleration data is greater than or equal to a predetermined fifth threshold. This processing is to detect the acceleration when a piece of furniture on which the environmental sensor unit 1 is mounted is moved to a different location for some reasons. The fifth threshold may be set to the lower limit of the acceleration that is experimentally determined by data obtained when the environmental sensor unit 1 is moved for some special reasons, other than normal daily vibrations.

When the obtained acceleration value is greater than or equal to the fifth threshold in S202, the processing advance to S203. When the obtained acceleration value is less than the fifth threshold, the processor determines that this is not the situation in which the environmental sensor unit 1 is moved for some special reasons, and the routine ends.

In S203, the processor determines whether the change in the obtained acceleration value is greater than or equal to a predetermined sixth threshold and is less than or equal to a predetermined seventh threshold. This processing is to detect a change occurring in the acceleration when the environmental sensor unit 1 is moved by a third party, which differs from vibrations in the acceleration caused by an earthquake. The sixth and seventh thresholds may be set to the lower and upper limit change in the acceleration that are experimentally determined by measuring the acceleration change when a third party intentionally moves the environmental sensor unit 1.

When the obtained change in the acceleration is greater than or equal to the sixth threshold and is less than or equal to the seventh threshold in S203, the processing advances to S101. When the obtained change in the acceleration is less than the sixth threshold or is greater than the seventh threshold, the processor determines that this is not the situation in which the environmental sensor unit 1 has been moved intentionally by a third party, and the routine ends.

In S101, the illuminance data is obtained by the illuminance sensor 4b in the same manner as described with reference to FIG. 3. After the processing in step S101 is complete, the processing advances to S204. In S204, the processor determines whether the change in the obtained illuminance value is greater than or equal to a predetermined eighth threshold. This processing is to detect that the environmental sensor unit 1 has been moved by a third party to another environment. The eighth threshold may be set to the lower limit change in the illuminance that is experimentally determined by measuring the value when the environmental sensor unit 1 has been moved greatly and is installed at a location exposed to another environment, instead of being moved slightly by a third party.

When the change in the obtained illuminance value is greater than or equal to the eighth threshold in S204, the processing advances to S104. When the change in the obtained illuminance value is less than the eighth threshold, the processor determines that the environmental sensor unit 1 has not been moved greatly and is not installed at a location exposed to another environment, and the routine ends. The processing in S104 and S105 is equivalent to the processing described with reference to FIG. 3, and will not be described.

Figure 5:
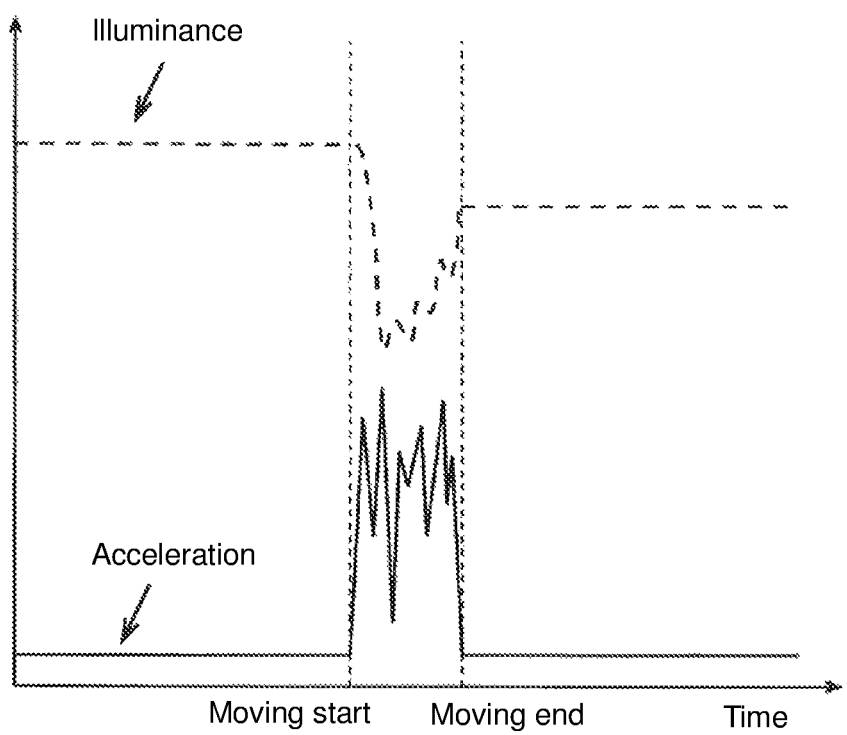
FIG. 5 is a graph illustrating a control procedure for a moving detection routine 2 according to a second embodiment.

FIG. 5 is a graph describing changes in each item of data when moving of the environmental sensor unit 1 is detected through the moving detection routine 2. As shown in FIG. 5, the acceleration data and the illuminance data are used in the present embodiment. For the environmental sensor unit 1 moved by a third party, at least a predetermined acceleration occurs during a period from the start to the end of such moving, with changes in the acceleration falling within a predetermined range. When the environmental sensor unit 1 is moved completely by a third party, and the acceleration and its change converges, the environmental sensor unit 1 will be installed at a different location (e.g., in a different room), for which the measured illuminance is likely to differ from the previous value by at least a predetermined degree.

The present embodiment focuses on such changes in the acceleration and the illuminance.

As described above, the acceleration measured by the acceleration sensor 4e and the change in the obtained value are used to detect moving of the environmental sensor unit 1 in the present embodiment. Further, the change in the illuminance value measured by the illuminance sensor 4b before and after detection of at least a predetermined acceleration and the change in the acceleration value falling within a predetermined range are used to detect that the environmental sensor unit 1 has been moved and is installed at a location exposed to another environment. In this manner, multiple items of data measurable by the environmental sensor unit 1 are combined to detect moving of the environmental sensor unit 1 in a more reliable manner. This reduces wasted time and energy resulting from the environmental sensor unit 1 continuously obtaining data unintended by the user, and thus reduces any wrong conclusions based on erroneous measurement results in a more reliable manner. The MCU 3 performing the processing in S201 to S203, S101, and S204 in the present embodiment functions as the moving detection unit of one or more embodiments. The process for transmitting an alert signal in S105 corresponds to the moving response process of one or more embodiments. The MCU 3 performing the processing in S105 functions as the moving response unit of one or more embodiments.

When a third party directly grips and moves the environmental sensor unit 1 during a period from the start to the end of the moving of the environmental sensor unit 1 in FIG. 5, the illumination indicated by the obtained illumination data is likely to decrease as shown in the figure, with the third party covering the lighting window 1e with his or her hand. In the present embodiment, the determination may be performed as to whether the illumination data measured by the illuminance sensor 4b indicates a decrease in the illumination exceeding a predetermined threshold while the change in the acceleration value in the predetermined range is being detected, in addition to before and after the change in the acceleration value in the predetermined range is detected. In this case, the environmental sensor unit 1 can detect direct moving of the environmental sensor unit 1 by a third party. The environmental sensor unit 1 can thus detect that the sensor unit has been moved by the action of a third party in a more reliable manner.

Third Embodiment

A third embodiment of one or more embodiments will now be described. In the example described in the present embodiment, moving of an environmental sensor unit is detected based on acceleration data and temperature data measured by the environmental sensor unit.

Figure 6:
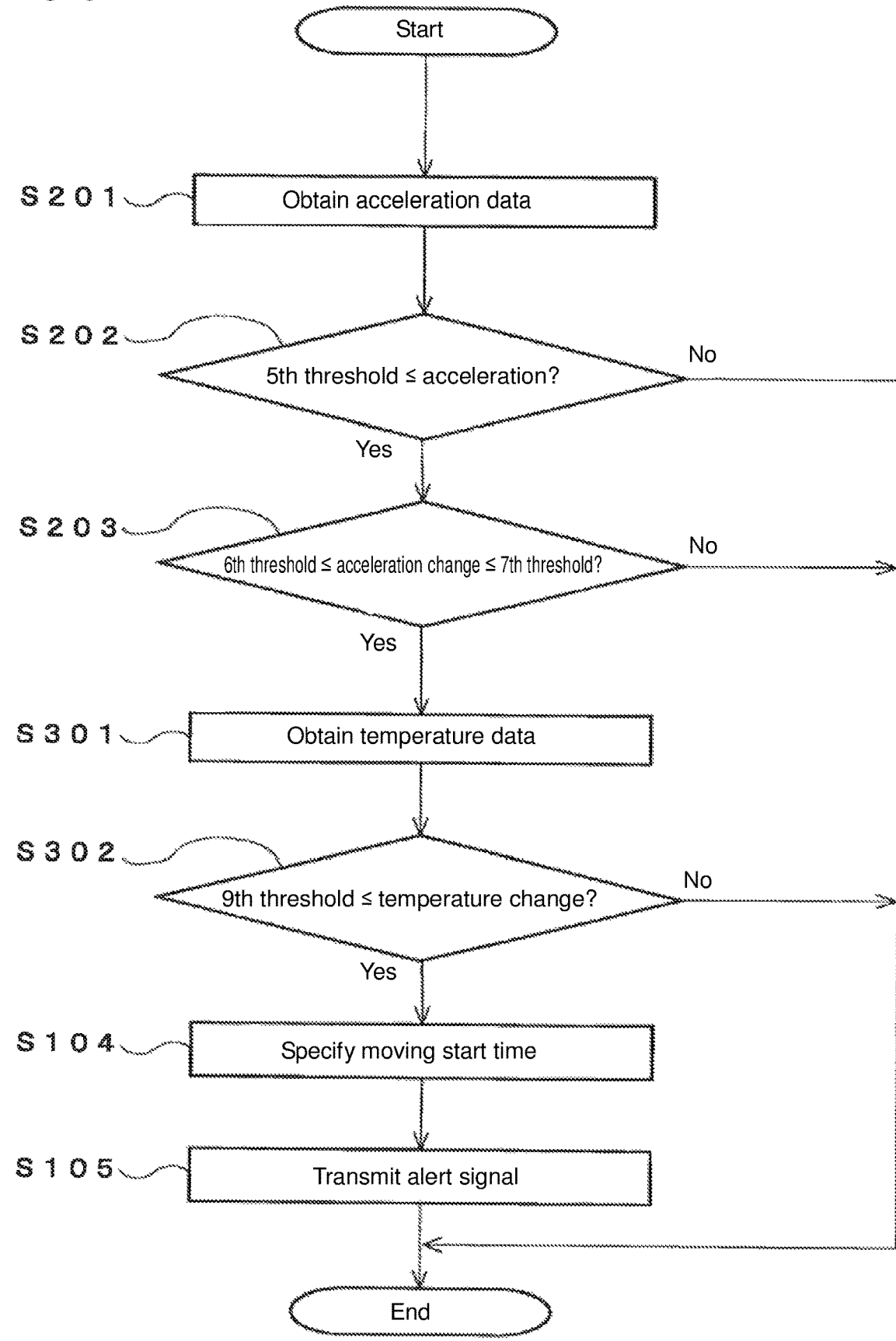
FIG. 6 is a flowchart illustrating a control procedure for a moving detection routine 3 according to a third embodiment.

FIG. 6 is a flowchart showing a moving detection routine 3 according to the present embodiment. This routine is a program stored in the memory included in the MCU 3, and is executed repeatedly by the processor included in the MCU 3 at predetermined intervals.

When this routine is started, the processing in S201 to S203 is performed first to determine that the acceleration has not been caused by an earthquake and the environmental sensor unit 1 has been moved by a third party. The processing is equivalent to the processing for the moving detection routine 2 shown in FIG. 4, and will not be described.

In the present embodiment, when the determination result from the comparison in S203 is affirmative, the processing advances to S301. When the determination result from the comparison in S203 is negative, the routine ends. In S301, the temperature-humidity sensor 4a obtains temperature data. After the processing in step S301 is complete, the processing advances to S302. In S302, the processor determines whether the change in the obtained temperature value is greater than or equal to a predetermined ninth threshold. Like the processing in step S204 in the moving detection routine 2, this processing also aims to detect that the environmental sensor unit 1 has been moved by a third party to another environment. The ninth threshold may be set to the lower limit change in the temperature that is experimentally determined by measuring the value when the environmental sensor unit 1 has been moved greatly and is installed at a location exposed to another environment, instead of being moved slightly by a third party.

When the change in the obtained temperature value is greater than or equal to the ninth threshold in S302, the processing advances to S104. When the change in the obtained temperature value is less than the ninth threshold, the processor determines that the environmental sensor unit 1 has not been moved greatly and is not installed at a location exposed to another environment, and the routine ends. The processing in S104 and S105 is equivalent to the processing described with reference to FIG. 3, and will not be described.

Figure 7:
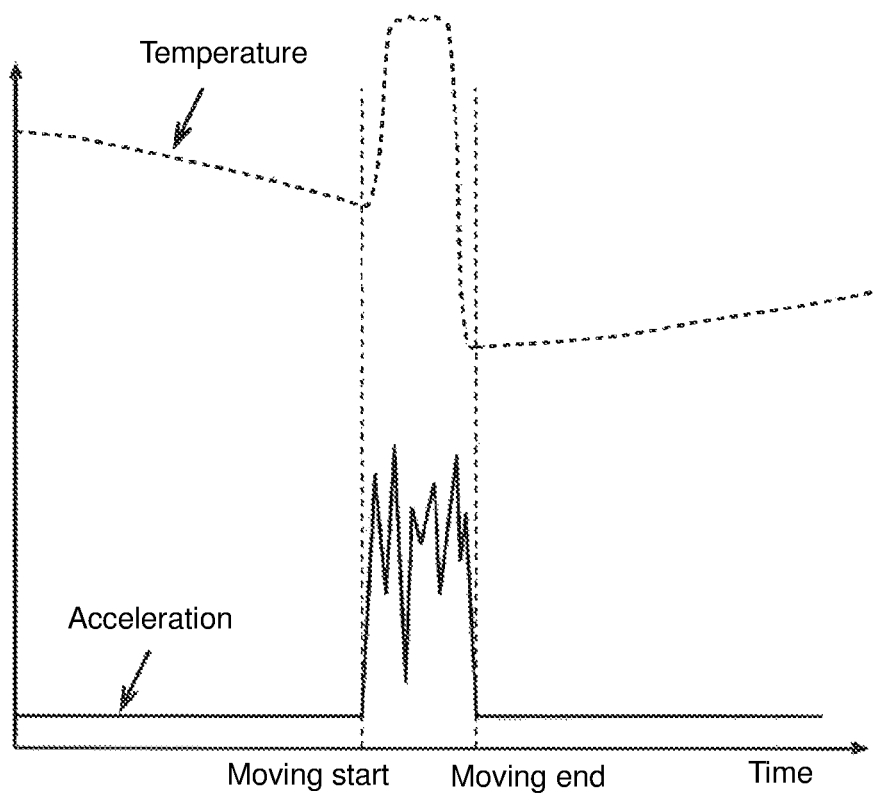
FIG. 7 is a graph illustrating a control procedure for a moving detection routine 3 according to a third embodiment.

FIG. 7 is a graph showing changes in each item of data when moving of the environmental sensor unit 1 is detected through the moving detection routine 3. As shown in FIG. 7, the acceleration data and the temperature data are used in the present embodiment. For the environmental sensor unit 1 moved by a third party, at least a predetermined acceleration occurs during a period from the start to the end of such moving, with changes in the acceleration falling within a predetermined range. When the environmental sensor unit 1 is moved completely by a third party, the environmental sensor unit 1 is installed at a different location (e.g., in a different room), for which the measured temperature is likely to differ from the previous value by at least a predetermined degree. The present embodiment focuses on such changes in the acceleration and the temperature.

As described above, the acceleration measured by the acceleration sensor 4e and the change in the obtained value are used to detect moving of the environmental sensor unit 1 in the present embodiment. Further, the change in the temperature value measured by the temperature-humidity sensor 4a before and after detection of at least a predetermined acceleration and the change in the acceleration value falling within a predetermined range are used to detect that the environmental sensor unit 1 has been moved and is installed at a location exposed to another environment. In this manner as well, multiple items of data measureable by the environmental senor unit 1 are combined to detect moving of the environmental sensor unit 1 in a more reliable manner. This structure reduces wasted time and energy resulting from the environmental sensor unit 1 continuously obtaining data unintended by the user, and thus reduces any wrong conclusions based on erroneous measurement results in a more reliable manner. The MCU 3 performing the processing in S201 to S203, S301, and S302 in the present embodiment functions as the moving detection unit of one or more embodiments. The process for transmitting an alert signal in S105 corresponds to the moving response process of one or more embodiments. The MCU 3 performing the processing in S105 functions as the moving response unit of one or more embodiments.

When a third party directly grips and moves the environmental sensor unit 1 during a period from the start to the end of the moving of the environmental sensor unit 1 in FIG. 7, the temperature indicated by the obtained temperature data is likely to rise sharply as shown in the figure, due to the body temperature of the third party. In the present embodiment, the determination may be performed as to whether the temperature data measured by the temperature-humidity sensor 4a indicates an increase in the temperature exceeding a predetermined threshold while the change in the acceleration value in the predetermined range is being detected, in addition to before and after the change in the acceleration value in the predetermined range is detected. In this case, the environmental sensor unit 1 can detect direct moving of the environmental sensor unit 1 by a third party. The environmental sensor unit 1 can thus detect that the sensor unit has been moved by the action of a third party in a more reliable manner.

Fourth Embodiment

A fourth embodiment of one or more embodiments will now be described. An environmental sensor of another type according to the present embodiment will be described.

Figure 8A:
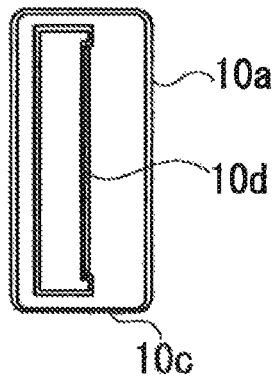
FIGS. 8A to 8C are external three views illustrating an environmental sensor unit according to a fourth embodiment.
Figure 8B:
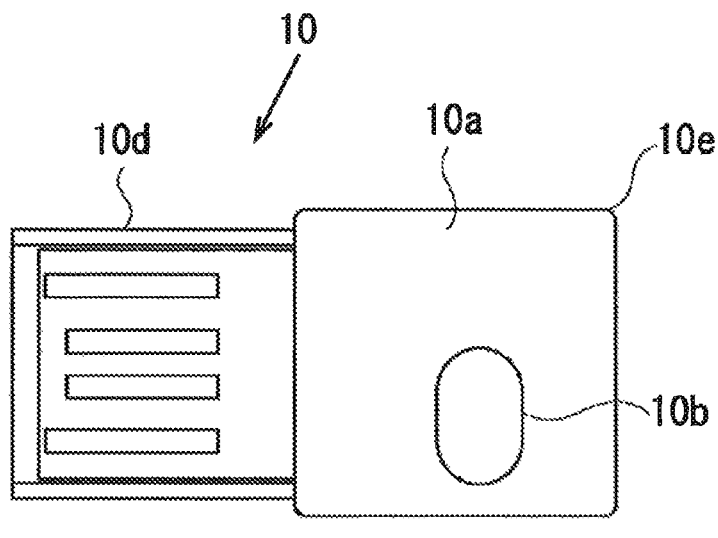
Figure 8C:
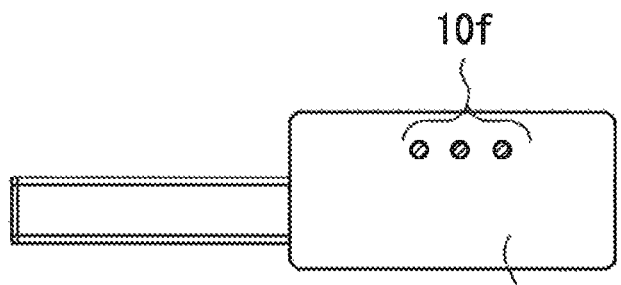

FIGS. 8A to 8C are external views of an environmental sensor unit 10 according to the present embodiment. The environmental sensor unit 10 uses a USB sensor. FIG. 8A is a side view of the environmental sensor unit 10 viewed from the distal end of a USB connector 10d. FIG. 8B is a front view of the environmental sensor unit 10 viewed from its front surface 10a. FIG. 8C is a side view of the environmental sensor unit 10 viewed from its one side surface 10c. The body of the environmental sensor unit 10 according to the present embodiment includes a rectangular parallelepiped casing 10e, which is substantially square when viewed from the front surface 10a and is substantially rectangular when viewed from the side surface 10c. The casing 10e contains the components shown in FIG. 1 (excluding the external power supply 6).

The environmental sensor unit 10, which includes the USB connector 10d, allows the obtained data to be either transmitted using the communication module 2 communicable with a remote controller, or to be directly provided to a remote controller such as a personal computer using the USB connector 10d. The environmental sensor unit 10 can be powered from an external power supply (a USB connector mounted device) through the USB connector 10d. The environmental sensor unit 10 may also operate on a battery (not shown) contained in the casing 10e. The environmental sensor unit 10 also has its front surface 10a having a lighting window 10b for collecting visible light and UV light. The lighting window 10b is formed from a material that transmits visible light and UV light. The intensity of the visible light passing through the lighting window 10b is detected by the illuminance sensor 4b, and the intensity of the UV light passing through the lighting window 10b is detected by the UV sensor 4c. This enables measurement of the illuminance and the UV light.

The side surface 10c of the environmental sensor unit 10 has vents 10f, which allow the outside air to flow into the environmental sensor unit 10. The target physical quantities are measured by the temperature-humidity sensor 4a, the atmospheric pressure sensor 4d, the microphone 4f, and the $CO_2$ sensor 4g using the outside air around the environmental sensor unit 10 flowing through the vents 10f into the environmental sensor unit 10.

Figure 9:
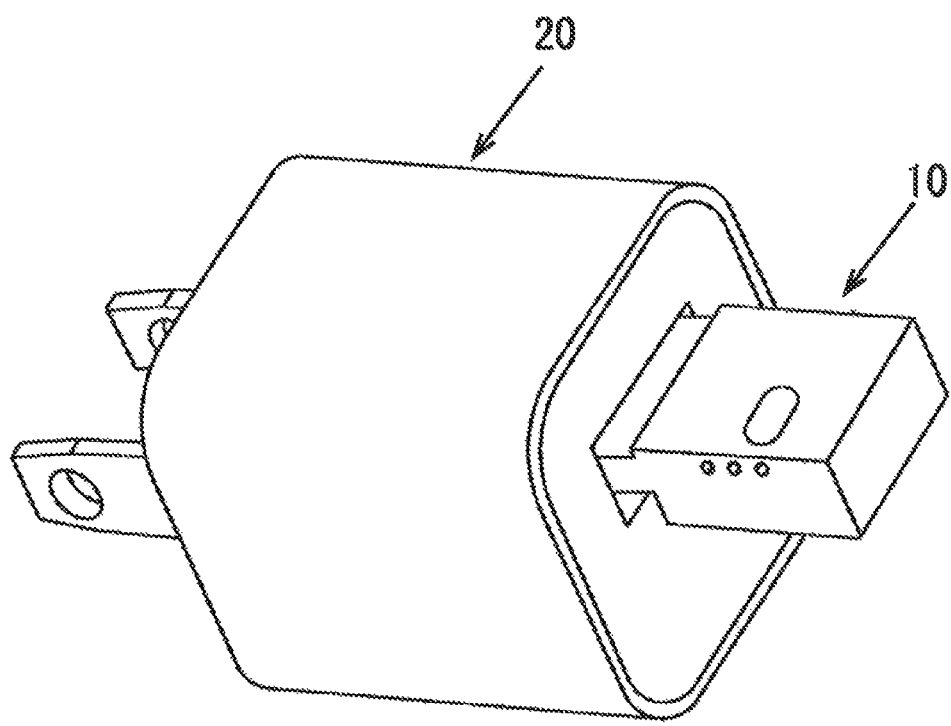
FIG. 9 is an external perspective view illustrating an environmental sensor unit and an outlet adapter according to a fourth embodiment.

FIG. 9 is a perspective view of the environmental sensor unit 10 connected to an outlet adapter 20. The environmental sensor unit 10 is provided with the outlet adapter 20. With the outlet adapter 20 inserted into a wall outlet at the installation location (e.g., in a room) in the state shown in FIG. 9, the environmental sensor unit 10 can be powered on and also can be fixed at the installation location in a stable manner.

This type of environmental sensor unit 10 is also designed to be installed at a location exposed to the environment in which environmental information is continuously obtained. However, the environmental sensor unit 10 may be moved together with the outlet adapter 20 to a different outlet by a deceptive third party. Further, the environmental sensor unit 10 and the outlet adapter 20 fixed to a power strip may be moved together with the power strip by a careless third party.

In that case, environmental data during or after such moving can be the data unintended by the user, which can cause wasted time and energy or wrong conclusions based on erroneous measurement results. The control procedures shown in the first to third embodiments for the environmental sensor unit 10 can reduce wasted time and energy resulting from the environmental sensor unit 10 continuously obtaining data unintended by the user and wrong conclusions based on erroneous measurement results.

Although moving of the environmental sensor unit 1 or 10 is detected based on acceleration data, illuminance data, and temperature data in the embodiments described above, moving of the environmental sensor unit 1 or 10 may be detected based on other data measurable by the environmental sensor unit 1 and the environmental sensor unit 10 or their combinations. For example, moving of the environmental sensor unit 1 and the environmental sensor unit 10 may be detected based on combinations of the acceleration and the humidity, the acceleration and the UV light, the acceleration and the atmospheric pressure (and its height), or the acceleration and the noise.

Although the processor in the MCU 3 performs the moving detection routines 1 to 3 in the embodiments described above, an external remote controller may also perform the moving detection routines 1 to 3. In this case, the communication module 2 may simply transmit a control signal for each sensor element to the environmental sensor unit. In this modification, a CPU included in the remote controller functions as the moving detection unit and the moving response unit.

Although the moving response process includes transmitting an alert signal indicating that the environmental sensor unit has been moved in the embodiments described above, the moving response process is not limited to this example. For example, the data obtained after the start time at which the environmental sensor has started moving may be deleted or may be distinguished from the data earlier obtained with any method.

REFERENCE SIGNS LIST 1, 10 environmental sensor unit
2 communication module
3 MCU
4a to 4g sensor
5 flash memory
6 external power supply
7 battery
20 outlet adapter

The invention claimed is:

1. An environmental sensor for measuring a plurality of physical parameters associated with a surrounding environment, the sensor comprising:
a plurality of sensor elements;
a micro controller unit functioning as:
a moving detection unit configured to detect moving of the environmental sensor based on at least one of the physical parameters or a change in the at least one physical parameters; and
a moving response unit configured to perform a predetermined moving response process in response to the moving detection unit detecting the moving of the environmental sensor, wherein
a sensor element, which is one of the plurality of sensor elements comprises an illuminance sensor, and the micro controller unit functioning as the moving detection unit detects the moving of the environmental sensor based on a decrease in an illuminance value detected by the illuminance sensor, and
in response to the obtained illuminance value being greater than or equal to a predetermined first threshold and less than or equal to a predetermined second threshold, and the change in the obtained illuminance value being greater than or equal to a predetermined third threshold and less than or equal to a predetermined fourth threshold, the micro controller unit specifies a time at which the environmental sensor elements have started moving after a time at which the illuminance value changed.

2. The environmental sensor according to claim 1, wherein
the plurality of sensor elements comprises the illuminance sensor and an acceleration sensor, and
the micro controller unit functioning as the moving detection unit detects the moving of the environmental sensor when a change in an illuminance detected by the illuminance sensor is greater than or equal to a predetermined value before and after the acceleration sensor detects an acceleration greater than or equal to a predetermined value and/or a change in an acceleration within a predetermined range.

3. The environmental sensor according to claim 2, wherein
the moving response process includes transmitting an alert signal to a user.

4. The environmental sensor according to claim 2, wherein the moving response process includes stopping measuring at least one of the physical quantities.

5. The environmental sensor according to claim 1, wherein
the plurality of sensor elements further comprises a temperature sensor and an acceleration sensor, and
the micro controller unit functioning as the moving detection unit detects the moving of the environmental sensor when a change in a temperature detected by the temperature sensor is greater than or equal to a predetermined value before and after the acceleration sensor detects an acceleration greater than or equal to a predetermined value and/or a change in an acceleration within a predetermined range.

6. The environmental sensor according to claim 5, wherein
the moving response process includes transmitting an alert signal to a user.

7. The environmental sensor according to claim 5, wherein
the moving response process includes stopping measuring at least one of the physical parameters.

8. The environmental sensor according to claim 1, wherein the moving response process includes transmitting an alert signal to a user.

9. The environmental sensor according to claim 1, wherein
the moving response process includes stopping measuring at least one of the physical parameters.

\* \* \* \* \*